United States Patent Office 2,786,246
Patented Mar. 26, 1957

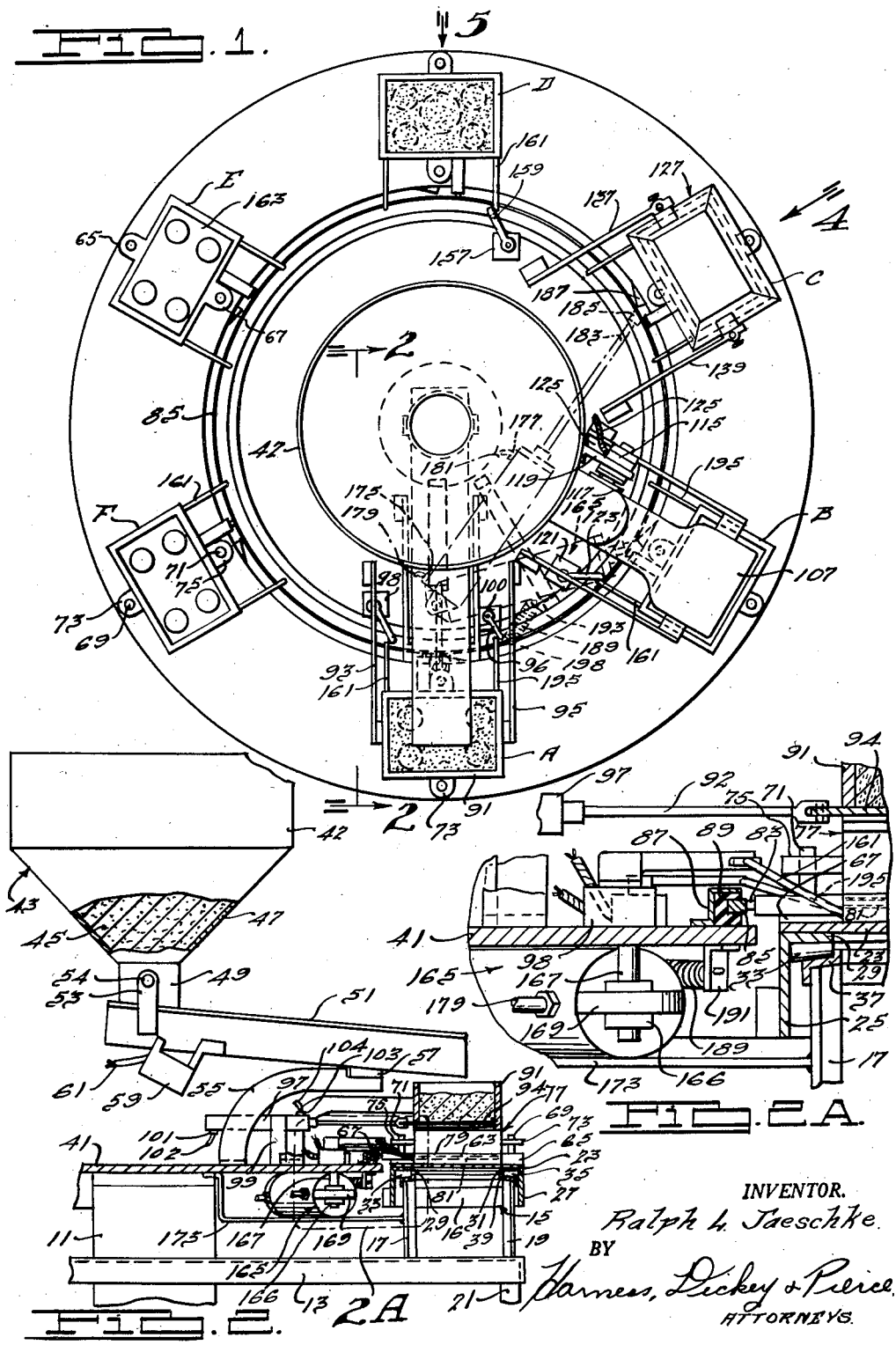

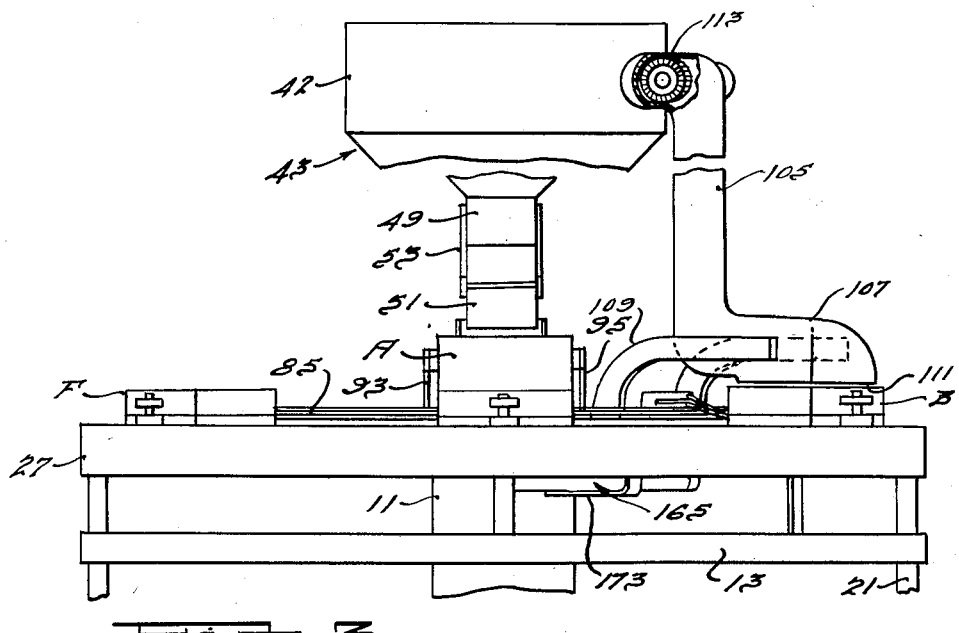
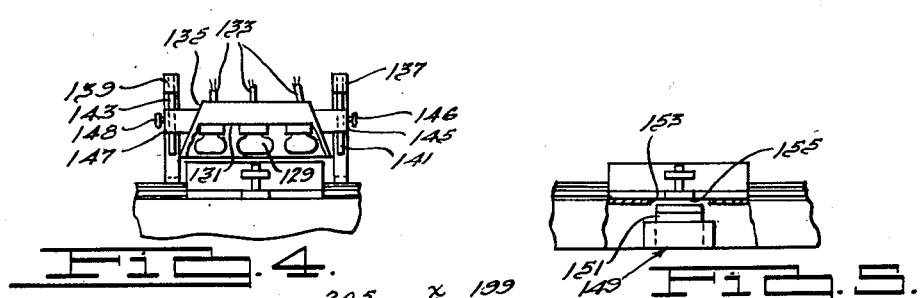
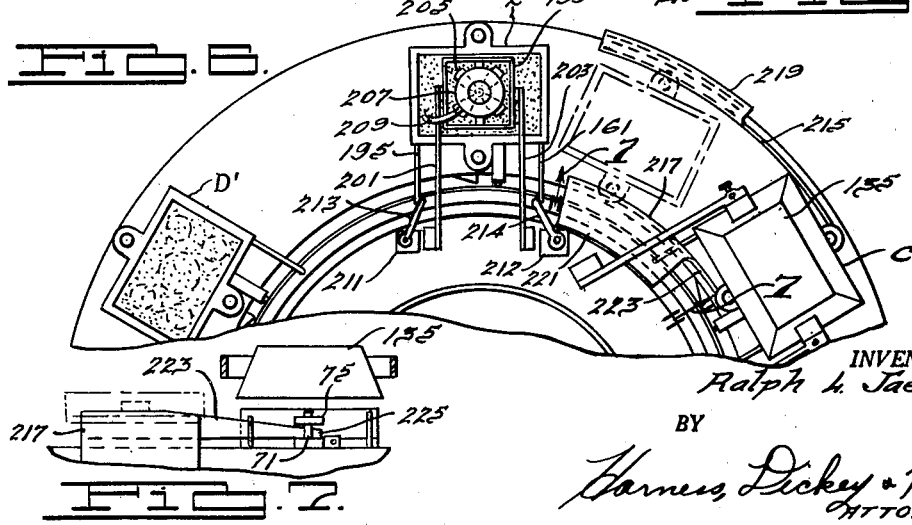

2,786,246

ROTARY MACHINE AND METHOD FOR THE MANUFACTURE OF SHELL MOLDS

Ralph L. Jaeschke, Kenosha, Wis., assignor, by mesne assignments, to Eaton Manufacturing Company, Cleveland, Ohio, a corporation of Ohio Application August 21, 1952, Serial No. 305,577

7 Claims. (Cl. 22—9)

This invention relates to a method and apparatus for the quantity production of shell molds for use in the casting of metallic articles.

Hitherto, shell molds have been manufactured by the well known dump process. The dump process makes use of a single heated pattern and utilizes the steps of successively depositing an excess of the molding material on a pattern by rotating a pattern-dump box assembly so that the molding material in the dump box is forcefully positioned on the pattern surface, removing the excess molding material after the elapse of a predetermined time by again rotating the dump box assembly to its original position, curing the adherent layer on the pattern and thereafter removing the formed shell mold half. In an attempt to speed up the production rate of the dump process, the shell mold half is removed from the pattern immediately after the final curing step and while the mold half is still quite hot. In this heated condition, the shell mold half is pliant and subject to distortion unless special precautions are taken to maintain the planar relation of its mating surfaces. The dump process suffers from the additional disadvantage that it is not particularly well adapted for rapid quantity production and the slow rate of production contributes to the high unit cost of the shell molds so produced.

It is, therefore, the principal object of the present invention to provide apparatus capable of rapid and relatively inexpensive quantity production of shell molds.

Another object of the invention is to provide apparatus by which mixtures of sand and a thermosetting resin may be semi-automatically transformed into shell molds suitable for use in the casting of a large variety of metallic articles of diverse sizes and shapes.

Further objects of the invention are to provide a method for making shell molds which is simple and efficient; to provide a method by which shell molds are formed in contact with a heated pattern and which are cooled after final curing of the shell mold to substantially the temperature of the pattern prior to their removal therefrom; to provide apparatus which is particularly adapted to form shell molds of substantially uniform wall thickness and with a high degree of reproducibility from mold to mold; and to provide apparatus which is relatively simple and inexpensive of manufacture and which is safe and positive in operation.

In general, the method of the invention comprises the steps of preliminarily admixing conventional foundry sand with a small quantity of a thermosetting resin, positioning the uniform admixture in a reservoir and periodically delivering a measured quantity of the mixture to the face of a pattern. The quantity of the mixture is regulated so that an excess is provided on the face of the pattern over that which is required to form a shell mold of the desired wall thickness. The mixture is deposited on the pattern surface with sufficient force to insure that the mixture fills all of the indentations and crevices in the formed pattern surface. The pattern is preliminarily heated and maintained at a temperature between about 350° F. and 450° F. to cause the resinous constituents of the mixture in contact with the pattern surface to soften and to adhere to the pattern surface. The excess mixture is retained in contact with the pattern surface until a layer of the desired thickness is formed. The time which is required to form the adherent layer varies with the thickness desired, the particular thermosetting resin present in the mixture and the temperature of the pattern and may range, for example, between about five seconds to sixty seconds. After the desired thickness of adherent layer is formed, the excess sand-resin mixture is removed from the back surface of the adherent layer by any convenient means such, for example, as strong suction or the like. When the excess mixture is removed, the adherent layer is subjected to additional heat in order to further polymerize and completely cure the resinous constituents in the adherent layer. The adherent layer is then cooled while in contact with the heated pattern to substantially the pattern temperature and is thereafter disengaged from the pattern surface and removed as a completed shell mold half. Cooling of the fully cured shell mold may be accomplished by any suitable means such as, for example, forced air, or by allowing sufficient lapse of time to enable cooling prior to disengagement of the shell mold from the pattern surface, etc.

The materials which may be used in forming the molding material comprise conventional foundry sands and any of a wide variety of thermosetting resins. The foundry sand should have an A. F. S. fineness of about 90 to 150 with somewhat better strength of mold resulting when the particle size is maintained between about 95 and 120. The foundry sand is preferably pure silica sand but small quantities of impurities such as clay and non-reactive metallic oxides may be tolerated in quantities not exceeding about 1% by weight. Phenol-aldehyde resins are preferred for use with such foundry sands, but other thermosetting resins such as the polyester resins may be used. The common phenol-formaldehyde resins which contain a slight excess of unreacted phenol and a mild alkaline catalyst, but which, nevertheless, have been sufficiently reacted to be in a solid and preferably finely divided form are recommended.

The preliminarily uniform admixture of the sand and the selected thermosetting resin may be accomplished in conventional mixing equipment such as a paddle mixer, a muller mixer or a common tumbler. It is usually desirable to preliminarily treat the sand with a small quantity of a wetting agent to reduce the dusting which results from the mixing operation. Wetting agents suitable for this purpose are, for example, petroleum hydrocarbons such as kerosene, solvent naphtha or other high boiling petroleum hydrocarbons. The proportion of the thermosetting resin which is used will vary between about 3½% to 10% by weight of the sand-resin mixture. For the majority of applications, proportions above about 7% have been found to be unnecessary.

In accordance with this invention, one form of apparatus suitable for effecting the heretofore described method of making shell molds, is provided and comprises a relatively large generally circular supporting frame having an axially disposed portion and a radially spaced annular table portion. The annular table portion carries a surface portion which rotates thereon, the rotatable surface portion being provided with a plurality of pattern stations disposed about the periphery thereof. A series of stations which are mounted on the axially disposed frame and stationary with respect to the rotatable table surface are spaced to cooperate with the pattern stations. The stationary stations are disposed either above or below the rotatable pattern stations and are adapted to sequentially effect the process steps of (1) depositing a measured quantity of sand-resin mixture on a pattern surface, (2) removing the excess sand-resin mixture while maintaining the pattern in a fixed position, (3) curing the shell mold layer, (4) cooling the shell mold in contact with the pattern, (5) disengaging the shell mold from the pattern surface, and (6) removing the completed shell mold. Modifications of this basic apparatus are shown and are adapted to automatically remove the pattern frame and to positively cool the shell mold before its removal from the pattern surface.

In the drawings:

Figure 1 is a top plan view of an apparatus embodying the features of this invention;

Figure 2 is a fragmentary sectional view of the apparatus of Fig. 1 taken along the line 2—2 thereof;

Fig. 2A is an exploded view of the portion of the apparatus included within the dotted circle of Fig. 1;

Fig. 3 is a front elevation view of the apparatus of Fig. 1;

Fig. 4 is a fragmentary sectional view of the heating station of the apparatus of Fig. 1 taken along the line 4—4 thereof;

Fig. 5 is a fragmentary sectional view of the pattern disengaging station of the apparatus of Fig. 1 taken along the line 5—5 thereof;

Fig. 6 is an apparatus of the type illustrated in Fig. 1 and showing a modification thereof; and Fig. 7 is a fragmentary view illustrating the automatic pattern frame removal means of the apparatus of Fig. 6 and taken along the line 7—7 thereof.

Referring to the drawings in greater detail, there is illustrated a relatively large circular supporting frame having a centrally disposed stationary portion 11, a radially extending lower table portion 13, having an outer downwardly depending supporting leg 21 and an annular supporting portion generally designated 15 connected to the portion 13. The annular supporting portion 15 is comprised of a pair of radially extending, upwardly extending legs 17, 19 and a plurality of horizontally disposed braces 16 attached to legs 17, 19 and angularly spaced about annular portion 15, and outer downwardly depending leg 21. Mounted on annular supporting portion 15 and adapted to rotate thereon is a surface or table portion 23 rigidly attached to a pair of flange members 25, 27. Flange members 25, 27 are provided with horizontally disposed leg portions 29, 31, respectively, which are adapted to seat against and to rest upon a plurality of angularly spaced rollers 33, 35 which are disposed between the lower surface of the horizontal leg portions 29, 31 and retaining housings 37, 39. Housings 37 and 39 are rigidly attached to upwardly disposed legs 17 and 19, respectively, and are provided with inwardly disposed upwardly extending flange portions which, in conjunction with the downwardly depending leg portions of flanges 25, 27 are adapted to insure against the radial motion of rollers 33, 35.

Centrally disposed support 11 is provided with a generally circular table portion 41, the periphery of which is spaced from the inner radial portion of the rotatable table 23. A centrally disposed reservoir 43 for the preliminarily admixed sand-resin mixture 45 is mounted on table 41 and provided with a conical portion 47 converging downwardly to a discharge spout 49. A radially disposed conveying trough 51 is attached to spout 49 by suitable rockable means such as arms 53 disposed on either side of trough 51 and pivoting about studs 54. The outer radial portion of trough 51 is mounted on table 41 by curved strap 55 having a resilient contact pad 57 such as rubber or the like attached to its outer end and in contact with the lower surface portion of trough 51. Radial vibratory motion of trough 51 is secured by vibrating means 59 which is attached to the lower surface of trough 51 and adapted to supply intermittent vibrational impacts to trough 51 so that the sand-resin mixture 45 is transported radially outwardly in the trough 51 at a controllable rate. The vibrating means 59 may be of the conventional type and is supplied with power through electrical cable 61.

As best seen in Fig. 1, rotatable table portion 23 is provided with a plurality of stations spaced about its periphery. Each station is comprised of a removably attached pattern 63 of generally rectangular shape having a pair of outwardly extending radially disposed ears 65, 67. Ears 65, 67 are provided with upwardly extending studs 69, 71, respectively, which are adapted to cooperate with and to be slidably received by cooperating outwardly extending ears 73, 75, carried by removable pattern frame 77. Removable pattern frame 77 is a hollow box-like frame, the wall portions of which form upward extensions of the peripheral portions of rectangular pattern 63.

Pattern 63 may be formed from a variety of materials including copper alloys, steel, polished aluminum, polished grey iron or the like. High carbon steels are particularly suitable and are preferred because of their tendency to maintain an even heat over wide temperature variations. The upper surface 79 of pattern 63 is preliminarily formed to present the desired configuration which is required to form a casting of the desired shape. While pattern 63 may be heated externally and periodically by acetylene torches, portable heaters or the like, it is preferred that the pattern be continually heated. As best seen in Fig. 2, constant heating is accomplished by providing a plurality of conventional resistance heating elements 81 within the body of the pattern 63 disposed closely adjacent to the upper surface 79 and extending transversely across the pattern 63. Electrical power is continuously supplied to resistance elements 81 during the rotation of table 23 by outwardly extending slideable contact 83 which is adapted to forcibly bear against circular bus bar 85 which is suitably mounted adjacent the periphery of table 41 and insulated therefrom and the mounting bracket 87 by insulating means 89.

For the sake of clarity, the stations disposed about the periphery of table 23 will be hereinafter denominated stations A, B, C, D, E, and F, beginning at the six o'clock position and progressing counterclockwise, and each will be described separately inasmuch as each station is adapted to perform one step of the above described process. Station A is provided with a stationary sand-resin mixture container 91 having a shape corresponding to that of frame 77 mounted on outwardly extending rigid supporting arms 93, 95 which are attached on either side thereof and secured at their inner ends to table 41. Sand-resin mixture container 91 is provided with a removable bottom 94 which is adapted to be radially, inwardly displaced so as to allow sand-resin mixture 45 to suddenly and forcefully impinge upon the upper surface 79 of pattern 63. Removable bottom 94 is rigidly attached to radially extending piston 92 of air cylinder 97 which is rigidly attached to table 41 by means of upwardly extending supporting strap 99 encircling air cylinder 97. Air cylinder 97 is provided with inner air port 101 and outer air port 103 and associated air supply hoses 102, 104, respectively, which are adapted to cause the radial movement of piston 95 in response to air under pressure admitted to either end of air cylinder 97 in a controlled manner as will hereinafter be more fully explained. The lower surface of resin-sand container 91 and the upper surface of the wall portions of pattern frame 77 are adapted to slideably engage and register so as to form a sealed enclosure.

Station B is provided with a suction pipe 105 having its inner end in sealed connection with the upper cylindrical portion 42 of reservoir 43 and its outer radial end 107 being flared to conform to the general shape of the rectangular pattern 63. The radial end 107 of pipe 105 is rigidly supported by outwardly extending arms 109 which are rigidly attached to table 41 at their inner ends. The lower surface or mouth 111 of suction pipe 105 is disposed in close vertical relationship with the top surface of the walls of the pattern frame 77, the peripheral boundry, however, being somewhat smaller than the opening or cavity defined by the frame 77 so that air may be drawn down into the frame 77 through the space surrounding the flared end 107 of the pipe 105. Pipe 105 is provided at its upper end with an internally positioned blower or fan 113 powered by a conventional electric motor 115 rigidly attached to the side of the pipe 105 by plate 117 and outwardly extending strap 119 having its inner end rigidly attached to reservoir 43. The blower 113 may be of the conventional centrifugal blower type and is preferably of sufficient capacity to insure adequate suction to lift the non-adherent sand-resin mixture from the surface 79 of the pattern 63 and return it to the reservoir 43. Electric switch 121 having a radially outwardly extending arm 123 is directly connected to electric motor 115 through cable 125. The automatic operation of switch 121 will be referred to hereinafter.

Station C is adapted to fully cure the resinous components of the resin-sand mixture and is provided with a heating means generally designated 127 for this purpose. Heating means 127 comprises a plurality of individual heaters 129 which may be of the resistance or infrared lamp type. As shown in Fig. 4, heaters 129 are mounted beneath and depend from a reflecting shield 131 and are provided with suitable electrical connecting means such as wires 133. Shield 131 which is rigidly attached to outer protective housing 135, and the entire unit is supported from table 41 by means of radially outwardly extending arms 137, 139. Arms 137, 139 are provided with downwardly depending leg portions 141 and 143, respectively, and housing 135 is attached to and vertically positionable on the legs 141, 143 by means of brackets 145, 147 having apertures for receiving legs 141, 143 and adjustment means such as set screws 146, 148. Variable vertical positioning of the heating means 127 enables the regulation of the rate of final curing of the adherent layer on the pattern surface and additionally enables the proper positioning to secure the concentration of the reflected infrared rays at a point beneath the upper surface of the adherent layer. The proper positioning of the heating means 127 has been found to be important in securing evenly and uniformly cured shell molds.

Station D is provided with a vibrating means 149 disposed beneath the surface of rotatable table 23. Vibrating means 149 is provided with an upwardly extending piston 151 which is adapted to extend through an accommodating aperture 153 in table 23 to enable the intermittent contact of piston 151 with the lower surface 155 of pattern 63. Vibrating means 149 as shown in Fig. 5 is a conventional make and break electrical vibrator, but it will be appreciated that mechanical means for causing the vibration of piston 151 may be equally satisfactorily employed, such, for example, a cam actuated means, etc. Station D is also provided with an electrical switch 157 having a radially outwardly extending arm 159 adapted to be engaged by a contacting arm carried by pattern 63.

Station E is provided for the purpose of enabling the manual removal of pattern frame 77 and the completed shell mold half 163. After shell mold half 163 has been removed, pattern frame 77 is repositioned on the upper surface of pattern 63 at station F and the pattern is ready for the cycle to be repeated.

Table 23 is rotated by air cylinder means generally designated 165 which is disposed beneath the surface of table 41 and pivoted for oscillation about stud 167 depending from table 41. Air cylinder means 165 is attached to stud 167 by means of bearing 166 carried by rearwardly extending plate 169 which is integral with air cylinder 165. Air cylinder means 165 is supported on its lower side by a strap 173 having its inner end rigidly secured to central support 11 and extending radially outwardly to the inner upwardly disposed leg 17 of the annular support 15. As may be seen in Fig. 1, air cylinder 165 is provided with inner air port 175 and outer air port 177 which are provided with suitable air supply hoses 179, 181, respectively. Air hoses 179, 181 are connected to a source of air under pressure through an automatic valve control means (not shown). As air is admitted through inner air port 175 into air cylinder means 165, piston 183, having an enlarged head portion 185 adapted to engage inwardly projecting stop 187 carried by table 23, is radially outwardly extended from the position shown at station B to the extended position shown at station C. As piston 183 reaches its fully extended position, the automatic valve operates to provide air to the outer air port 177, thereby retracting piston 183. Air cylinder means 165 is returned to its initial position by suitable means such as spring 189 disposed between a bracket 191 attached to table 41 and apertured flange 193 attached to the side of air cylinder means 165. Thus air cylinder means 165 moves in a horizontal plane causing table 23 to advance in a counter-clockwise direction from station to station which, as shown, is 60°.

For the purpose of describing the sequential operation of the machine, it will be assumed that sand container 91 is filled with a supply of sand-resin mixture 45 from reservoir 43. Automatically controlled valve means associated with air cylinder means 165 initiate the counter-clockwise rotation of table 23 by providing air under pressure to inner air port 175 causing the radial extension of piston 183 as above explained. As frame 77 moves into final registry with container 91 at station A, inwardly projecting arm 195 carried by the pattern 63 actuates air valve means 100 admitting air under pressure to outer air port 103 of air cylinder 97 to thereby cause the radial retraction of false bottom 94 of sand container 91. Sand-resin mixture 45 thereby drops onto the upper surface 79 of heated pattern 63. In accordance with the predetermined time cycle established to control the automatic valves supplying air to air cylinder means 165, outwardly projecting piston 183 will, during the interval while table 23 is at rest, return to its retracted position and air cylinder 165 will be returned by spring 189 to its original position as shown in the dotted lines at station B. Air under pressure is then admitted to rearward air port 175 and counter-clockwise rotation of the table 23 moves frame 77 with its charge of sand-resin mixture 45 toward station B.

As pattern 63 leaves its position at station A and at the inception of its motion toward station B, radially inwardly projecting arm 161 operates electrical switch 98 which is connected to vibrating means 59 thereby initiating the flow of mixture 45 into container 91. Substantially simultaneously with the operation of switch 98, arm 195 forces arm 96 to stop the supply of air to air port 103 of air cylinder 97 and to provide air to port 101 thereby causing the repositioning of bottom 94 in container 91. As the counter-clockwise rotation of table 23 is continued, the sand container 91 is filled to the desired level, and the vibrating means is inactivated by a timing mechanism (not shown). Preliminary calibration of the required time to obtain the desired quantity of sand provides control to enable production of a variety of shell molds of varying wall thickness. As pattern 63 is advanced to station B, radially inwardly projecting arm 161 operates electrical switch 121 to initiate the operation of blower 113 thereby creating suction over the upper surface 79 of pattern 63. The excess of sand-resin mixture 45 which is non-adherent to the upper surface of the pattern 63 is removed upwardly through pipe 105 by the suction created by blower 113 in the interval during which table 23 is at rest. Air cylinder means 165 is automatically actuated as above explained and blower 113 is electrically disconnected as radially inwardly projecting arm 161 moves out of contact with arm 123. Switch 121 is of the push button normally off type and completes the electrical circuit when arm 123 is deflected by the pressure of arm 161 only.

The operation of air cylinder means 165 advances pattern 63 with its adherent shell mold layer thereon, to station C where heaters 129 effect the final curing of the resinous constituents in the adherent layer. As suggested hereinabove, the heating means 127 is preferably positioned at a distance from the adherent layer such that the major portion of the reflected infrared rays is focused at a point beneath the surface of the adherent layer.

It will be appreciated that the timing of the automatic air valves actuating air cylinder means 165 will be set so that proper curing of the adherent layer will be obtained during the "at rest" portion of the rotation cycle. It will be apparent that the "at rest" time at both stations A and B is not as important as the cure time at station C and that the basic component of the timing is the cure time. The thickness of the adherent layer may be controlled by regulating the temperature of the pattern so that the desired thickness of adherent layer is formed on the pattern surface in the interval of time between the provision of the sand-resin mixture on the pattern surface and the arrival of the pattern at station B. Inasmuch as the pattern temperature may vary between about 350° F. and 500° F., it will be clear that no difficulty will be experienced in establishing the required temperature.

Air cylinder means 165 then advances pattern 63 to station D where radially inwardly projecting arm 161 operates switch 157 to actuate vibration means 149. Vibration means 149 continues to operate until the switch 157 is de-energized by the passing of arm 161 out of contact with arm 159 thereby opening the electrical circuit to the vibrating means.

After the shell mold 163 is disengaged from the upper surface 79 of the pattern 63 by the vibrational impacts, it is preferable to allow the shell mold to remain on the pattern until the temperature has decreased so that the shell mold is no longer pliant and subject to distortion upon handling. In the usual case of a relatively thin wall shell mold, sufficient cooling occurs between stations C and E so that the shell mold is sufficiently rigid to prevent warpage upon removal from the mold. In instances, however, where the shell mold wall thickness is relatively thick and the heat supplied at station C is not dissipated by the time the pattern advances to station E, it is desirable to employ an additional station providing positive cooling means such as is shown in the modification of Figure 6.

In the modification of Fig. 6, station C remains unchanged and is designated as C', while former station D becomes a blower station, shown at X, and the vibrator is transferred to the position formerly occupied by station E of Fig. 1 and is shown at D'. The blower is comprised of a supporting housing 199 rigidly attached to table 41 by means of a pair of radially outwardly extending arms 201, 203 having their inner ends anchored to table 41 and a motor 207 provided with a plurality of fan blades 205 mounted on housing 199 and disposed so that the forced air currents impinge directly on the rear surface of the adherent layer on the pattern 63. Motor 207 is connected to a source of power through cable 209 and electrical switches 211, 212. Switch 211 is provided with a radially outwardly extending actuating arm 213 which is adapted to be contacted by radially inwardly projecting arm 195 carried by pattern 63, and switch 212 has arm 214 adapted to be operated by arm 161. Switch 211 is adapted to close the electrical circuit to motor 207 when deflected by arm 195, and the circuit remains closed and the blower operates during the "at rest" period and is turned off by the deflection of arm 214 of switch 212 by arm 161 when the pattern 63 is moved counter-clockwise to station E. The operation of blades 205 during the "at rest" portion of the processing cycle insures the reduction of the temperature of the adherent layer to substantially that of the heated pattern 63 so that its subsequent removal and handling at station F does not cause warpage or distortion. Shell mold halves removed after cooling on the pattern, form better fitting molds which substantially eliminate the formation of flash during subsequent casting operations.

In the normal semi-automatic operation of the apparatus of Fig. 1, pattern frame 77 is manually removed at station E to enable the ready removal of the shell mold 163. Automatic means for removing the pattern frame 77 is illustrated in Figs. 6 and 7. As there shown, the portion of the table 23 between stations C' and D' is provided with a pair of rails 215, 217 which are rigidly supported from legs 17 and 19 of the annular support 15 by downwardly depending frames 219, 221. Rails 215 and 217 are disposed adjacent to the peripheral edges of the annular table 23 and are adapted to cooperate with outwardly extending ears 73, 75 of pattern frame 77. Both rails 215, 217 near their point of origin at station C' are provided with an inclined portion 223, the lower end 225 of which is disposed beneath the ears 73, 75. As the table 23 is rotated in the counter-clockwise direction, ears 73, 75 engage the inclined portion 223 and are forced along the inclined portion 223 so long as ears 73, 75 continue to engage upstanding pins 69, 71. The inclined portion 223 is adapted so that upstanding pins 69, 71 continue to force pattern frame 77 on rails 215, 217 until the position shown in the dotted lines of Fig. 7 is attained. At this level, pins 69, 71 slide out of an engagement with the cooperating apertures in ears 73, 75 and the pattern frame 77 is effectively removed from the pattern 63. Pattern frames thus removed may be manually transferred to station F where they are repositioned on the pattern 63 or, if desired, an automatic transfer mechanism may be provided from the removal rails to station F.

It will be appreciated that the circular form of the apparatus for effecting the process steps of this invention, is given for illustrative purposes only, and that identical process steps may be performed in comparable sequence on an apparatus having the various stations arranged in in-line relation. Various changes, modifications and additions may be made to the apparatus of this invention without departing from the broad scope and spirit thereof as set forth in the appended claims.

What is claimed is:

1. In a machine for the production of shell molds, a base having a central stationary portion and an annular portion spaced radially from said central portion, a rotatable table mounted on said annular portion, means for rotating said table, a plurality of stations spaced about the periphery of said table, each said station comprising a releasable pattern having a pair of upstanding pins disposed substantially centrally of said pattern and radially aligned, a bottomless box-like container vertically slidably positioned on said pins, the walls of said container forming vertical extensions of the peripheral edges of said pattern, a temporary storage container carried by said central portion and disposed above and in cooperation with said patterns, a mold material reservoir mounted on said central portion, means connecting said reservoir and said temporary container and transferring means for conveying mold material from said reservoir to the said container, said central portion supporting a suction member, the outer end of which cooperates with said patterns and the inner end of which cooperates with said reservoir, means for creating a suction in said suction member whereby excess mold material is transferred from a pattern station to the said reservoir, means for curing said mold material, and vibrating means for disengaging the cured shell mold from the pattern surface.

2. In a machine for producing shell molds, an inner circular support, an outer annular support radially spaced from said inner support, a ring-like table on said annular support and rotatable relative thereto, a plurality of angularly spaced pattern stations positioned on and adjacent to the periphery of said table, means for rotating said table, reservoir means carried by said inner support for storing shell mold material and associated means for delivering said molding material to said pattern stations, stationary means mounted on said inner support and disposed above a pattern station for temporarily receiving a charge of molding material, means actuable by the rotation of said table for forcefully discharging said molding material on the surface of said pattern, excess molding material transferring means carried by said inner support adapted to transport excess molding material from the face of said pattern to said reservoir, means actuating said material transferring means responsive to the rotary motion of said table, molding material curing means carried by said inner support and disposed above a pattern station, ejecting means carried by said inner support and disposed beneath a pattern station for dislodging a cured shell mold from the pattern surface and means for actuating said ejecting means responsive to the rotary movement of said table.

3. In a machine for producing shell molds, an inner circular support, an outer annular support radially spaced from said inner support, a ring-like table on said annular support and rotatable relative thereto, a plurality of angularly spaced pattern stations positioned on and adjacent to the periphery of said table, each said station comprising a pattern having a pair of centrally disposed upwardly extending pins, and a removable pattern frame, radial ears on said frame adapted to receive said pins, means for rotating said table, reservoir means carried by said inner support for storing shell mold material and associated means for delivering said molding material to said pattern stations, stationary means mounted on said inner support and disposed above a pattern station for temporarily receiving a charge of molding material, means actuable by the rotation of said table for forcefully discharging said molding material on the surface of said pattern, excess molding material transferring means carried by said inner support adapted to transport excess molding material from the face of said pattern to said reservoir, means actuating said material transferring means responsive to the rotary motion of said table, molding material curing means carried by said inner support and disposed above a pattern station, ejecting means carried by said inner support and disposed beneath a pattern station for dislodging a cured shell mold from the pattern surface and means for actuating said ejecting means responsive to the rotary movement of said table, separating means carried by said annular support for automatically disengaging the said pattern frame from the said pattern.

4. A machine as claimed in claim 3 wherein said separating means comprises a pair of tracks disposed above and adjacent to the inner and outer radial edges of said ringlike table and adapted to cooperatively receive the radial ear extensions of said pattern frame, said track being inclined upwardly in a counter-clockwise direction whereby counter-clockwise rotation of said table automatically separates the pattern frame from the said pattern.

5. A machine for producing shell molds comprising in combination a plurality of stationary stations, a plurality of pattern stations movable relative to said stationary stations and adapted to cooperate therewith, air cylinder means adapted to advance said pattern stations from one stationary station to the next stationary station intermittently and in response to a predetermined time cycle, said pattern stations each comprising a pattern and a pattern frame removably mounted on said pattern, a plurality of separate means so disposed on said base as to be in cooperative relationship with said pattern stations sequentially as said pattern stations are moved relative thereto, said means including means for depositing an excess of shell molding material on a pattern disposed therebeneath comprising a molding material container having a removable bottom, said removable bottom being connected to air cylinder means for radially withdrawing said bottom from said container, air suction means for removing non-adherent shell molding material from the said pattern surface comprising a pipe having its inner end in connection with a centrally disposed molding material reservoir and its outer end flared to the approximate shape of the said pattern frame, said flared end being positioned immediately above said pattern frame, blower means positioned within said pipe for creating a suction at said flared end, means for curing an adherent layer of partially cured shell molding material on said pattern surface and means for ejecting the cured shell mold from the pattern surface.

6. The method of making shell molds which comprises the steps of admixing sand and a thermosetting resin, forcefully depositing an excess of the sand-resin admixture on the upper surface of a heated pattern, maintaining the excess sand-resin mixture in contact with said heated pattern to form thereon an adherent layer of partially polymerized sand-resin mixture, removing the excess sand-resin mixture by suction applied over said pattern while retaining the same in an upright position, applying external heat to said adherent layer to fully cure the resinous constituents thereof, applying repeated vibrational impacts to said pattern to disengage the said cured layer from the said pattern, air cooling said layer to substantially the temperature of the said pattern and thereafter removing said layer from said pattern.

7. The method of making shell molds which comprises the steps of admixing sand and a phenol-aldehyde resin in the proportions of 90% to 96½% sand, and 3½% to 10% phenol-aldehyde resin, forcefully depositing an excess of the said mixture on the upper surface of a pattern having a temperature between about 350° F. to 500° F., maintaining said excess mixture on said pattern for a time between about five seconds and sixty seconds, removing the non-adherent sand-resin mixture by applying suction over the surface of said pattern while retaining the same in an upright position, applying infrared heat to said adherent layer to fully polymerize the resinous constituents, applying repeated vibrational impacts to said pattern to separate the said adherent layer from said pattern, air cooling said layer to substantially the temperature of the said pattern and thereafter removing said layer from said pattern.

References Cited in the file of this patent

UNITED STATES PATENTS

| 819,883 | Hewlett et al. | May 8, 1906 |
| 827,127 | Waite | July 31, 1906 |
| 2,588,669 | Taccone | Mar. 11, 1952 |
| 2,695,431 | Davis | Nov. 30, 1954 |

FOREIGN PATENTS

| 832,934 | Germany | Mar. 3, 1952 |

OTHER REFERENCES

Fortune, July 1952, pages 104–106, 140 and 143.
The Iron Age, vol. 169–20, May 15, 1952, pages 109–113.